No. 683,397. Patented Sept. 24, 1901.
R. HERMAN.
SIGNALING MECHANISM.
(Application filed Jan. 14, 1901.)
(No Model.) 9 Sheets—Sheet 4.

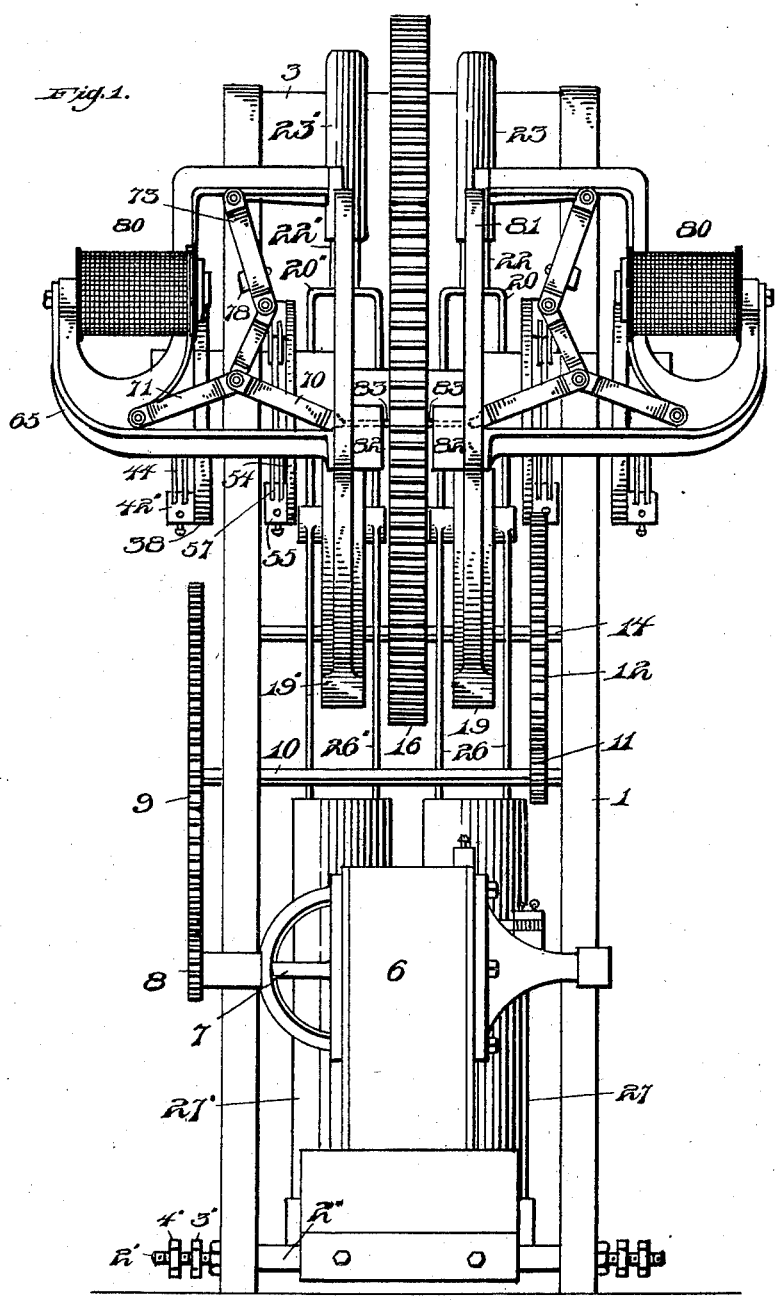

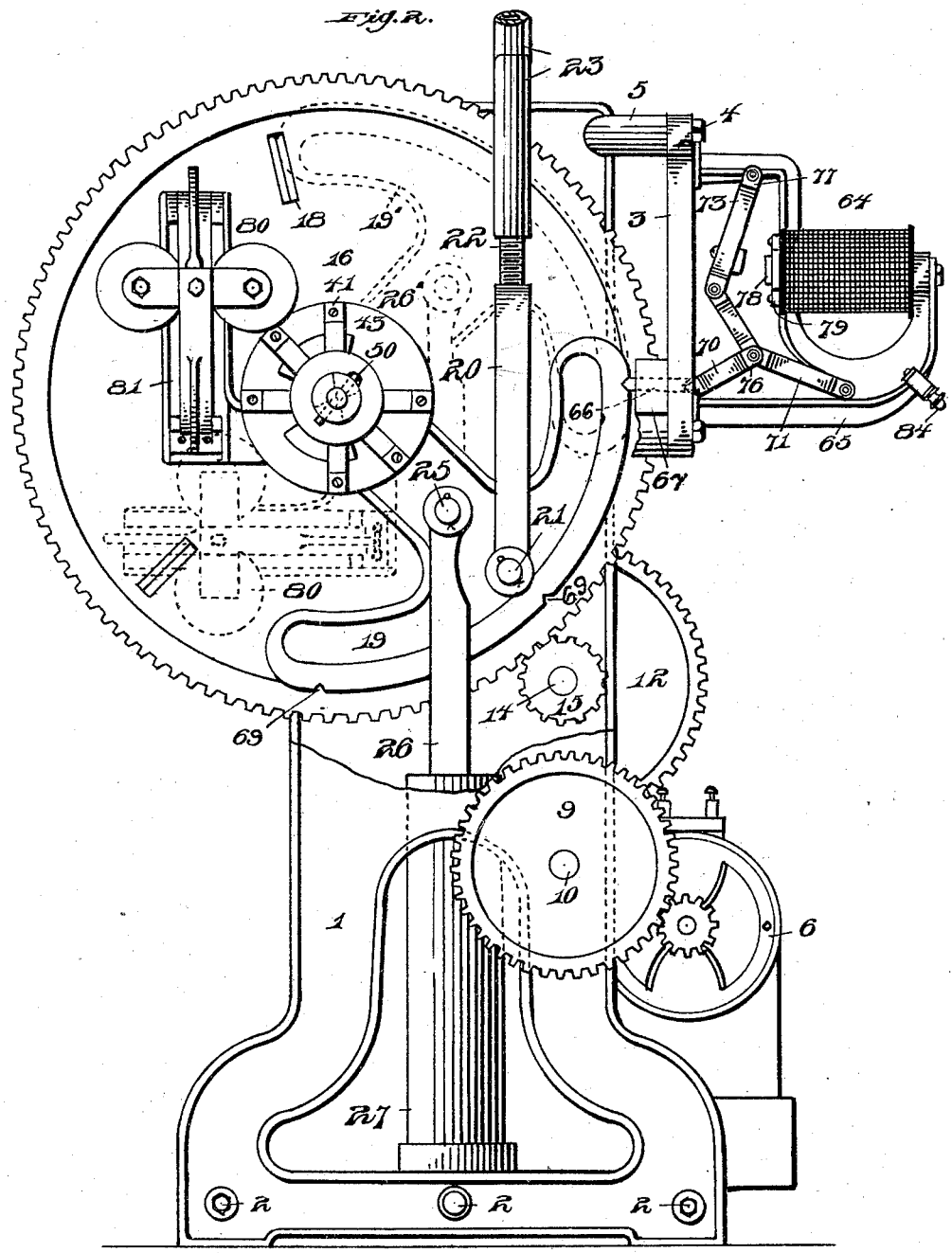

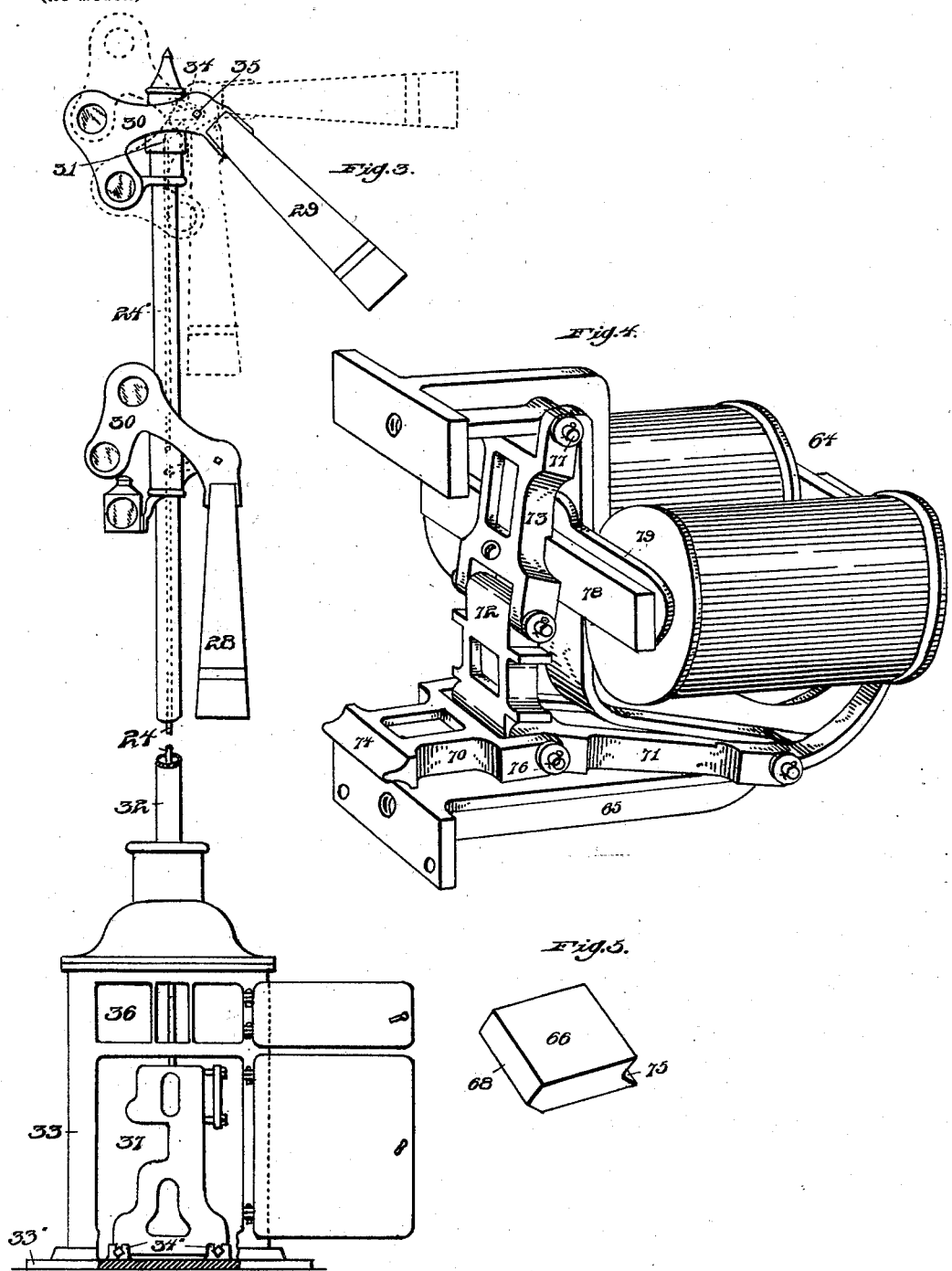

Witnesses: Inventor
R. Herman.
By
Attys

No. 683,397.　　　　　　　　　　　Patented Sept. 24, 1901.
R. HERMAN.
SIGNALING MECHANISM.
(Application filed Jan. 14, 1901.)

(No Model.)　　　　　　　　　　　　　　　　9 Sheets—Sheet 6.

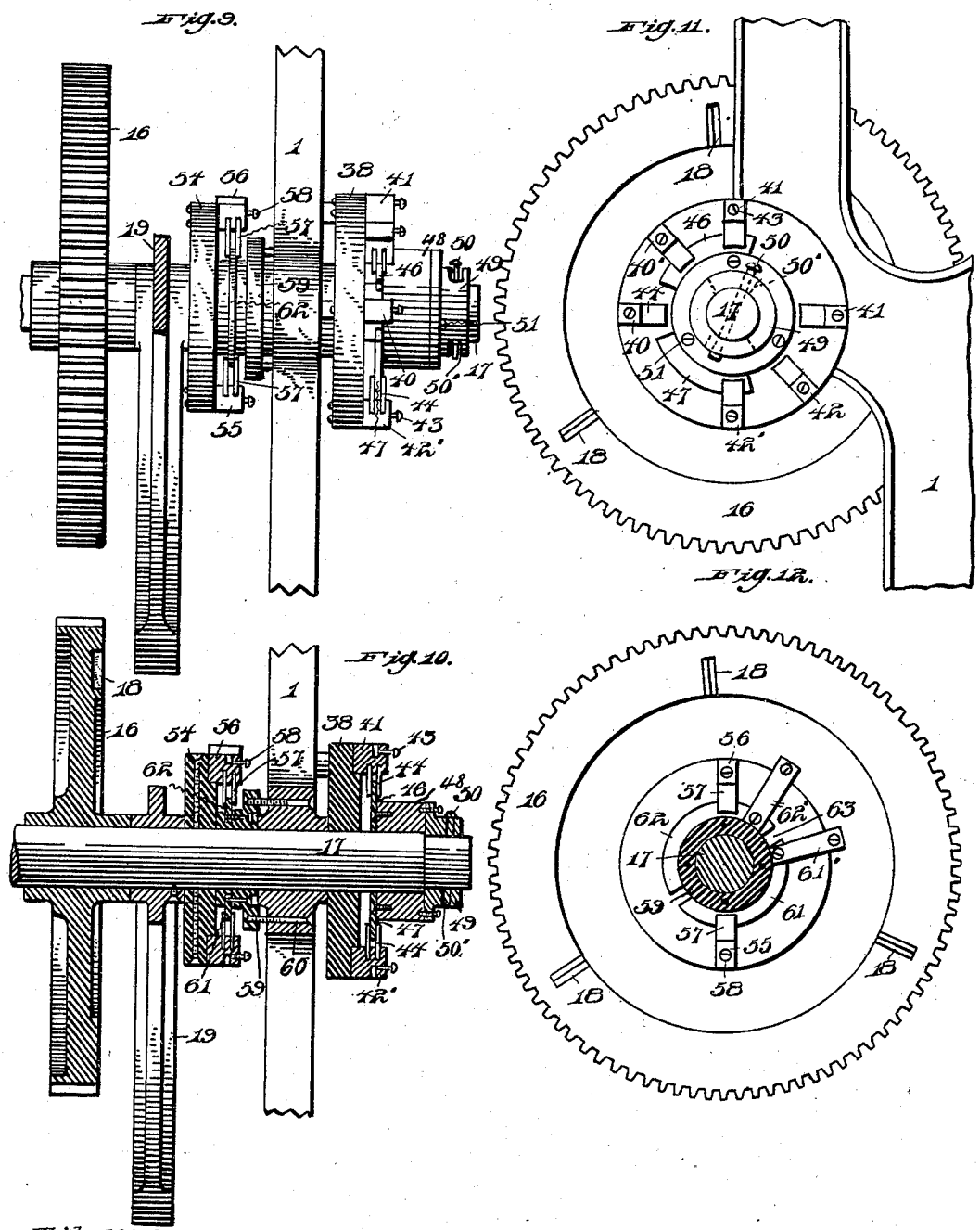

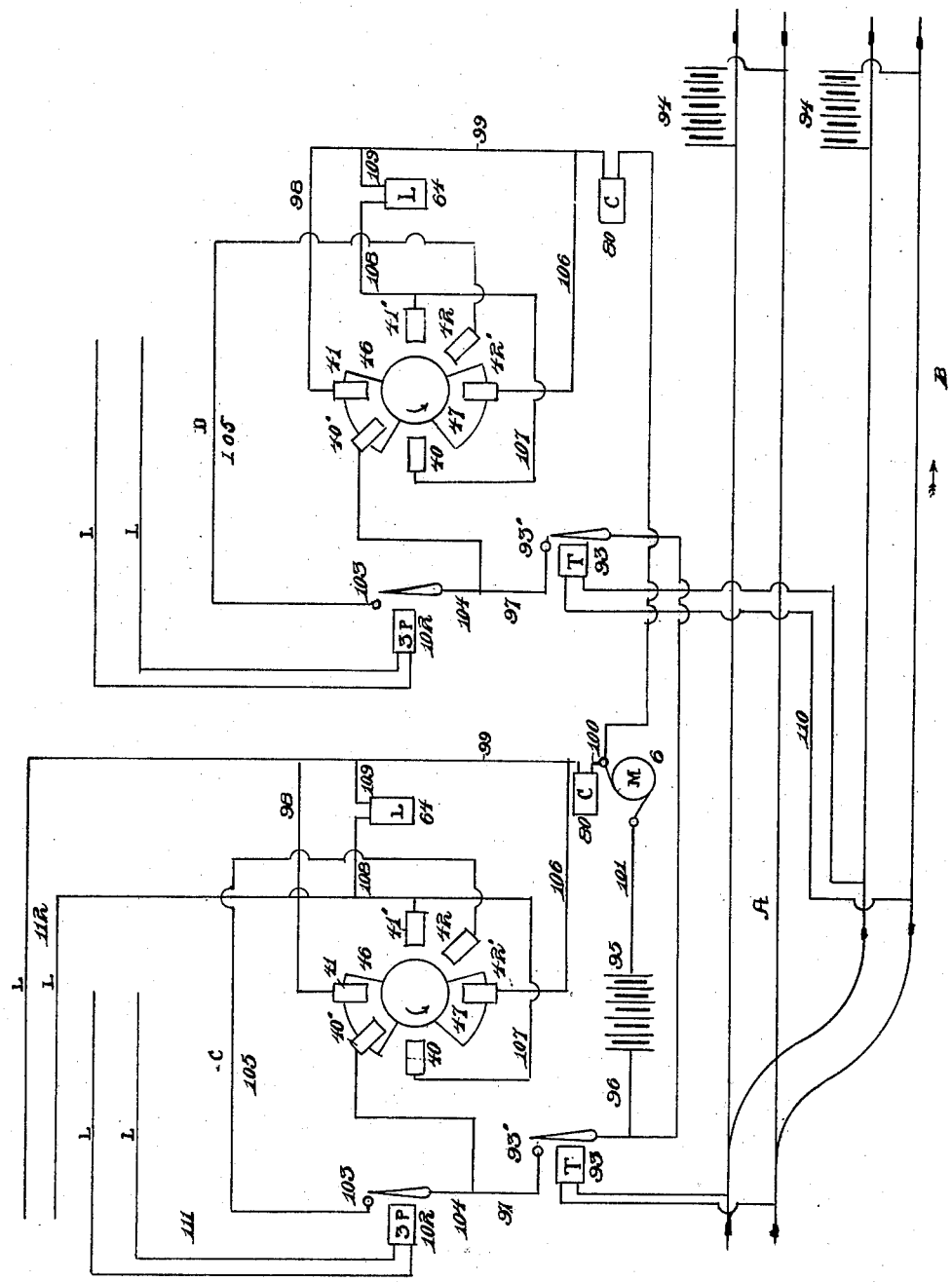

No. 683,397. Patented Sept. 24, 1901.
R. HERMAN.
SIGNALING MECHANISM.
(Application filed Jan. 14, 1901.)
(No Model.) 9 Sheets—Sheet 9.
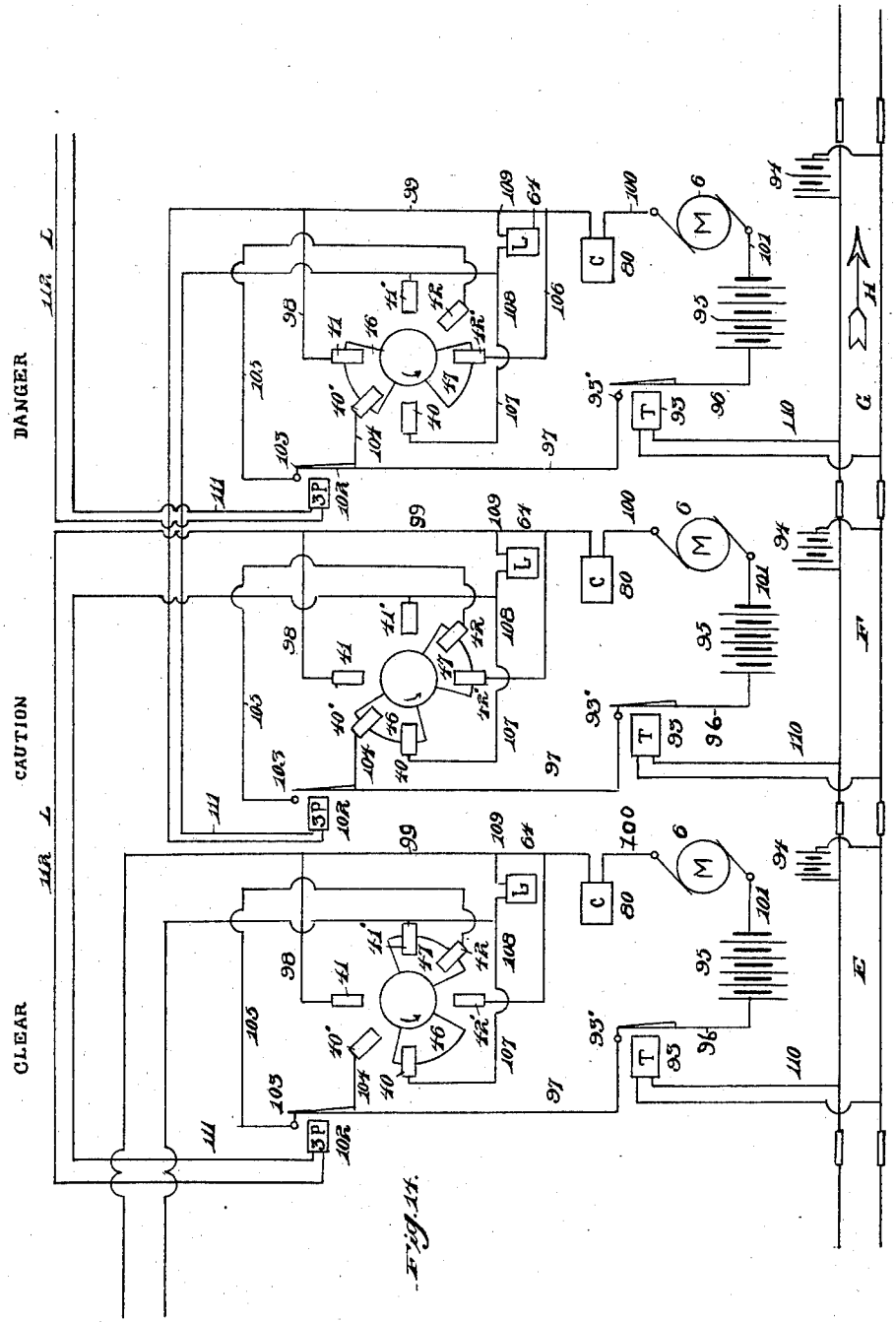
Witnesses:
J. P. Hefleman,
E. E. Potter
Inventor
R. Herman
By
H. C. Everts & Co.
Atty's

UNITED STATES PATENT OFFICE.

REINHOLD HERMAN, OF CRAFTON, PENNSYLVANIA.

SIGNALING MECHANISM.

SPECIFICATION forming part of Letters Patent No. 683,397, dated September 24, 1901.

Application filed January 14, 1901. Serial No. 43,189. (No model.)

*To all whom it may concern:*

Be it known that I, REINHOLD HERMAN, a citizen of the United States of America, residing at Crafton, in the county of Allegheny and State of Pennsylvania, have invented certain new and useful Improvements in Signaling Mechanism, of which the following is a specification, reference being had therein to the accompanying drawings.
This invention relates to certain new and useful improvements in signaling mechanism, and has for its object a construction and arrangement of operating mechanism and controlling circuits whereby the same signal may be employed as a "home" and "distant" signal, the movements of the signal from "clear" to "danger" and "caution" being effected automatically, but controlled by train movements.
A further object of the invention is to construct a signal mechanism and controlling-circuits therefor whereby one or more independent signals may be operated by the same operating mechanism and controlling-circuits, each signal being operated and controlled independently of the other signal or signals, or in unison therewith, as desired.

In describing the invention in detail reference will be had to the accompanying drawings, forming a part of this specification, and wherein like numerals of reference will be employed for designating like parts throughout the several views of the drawings, in which—

Figure 6:
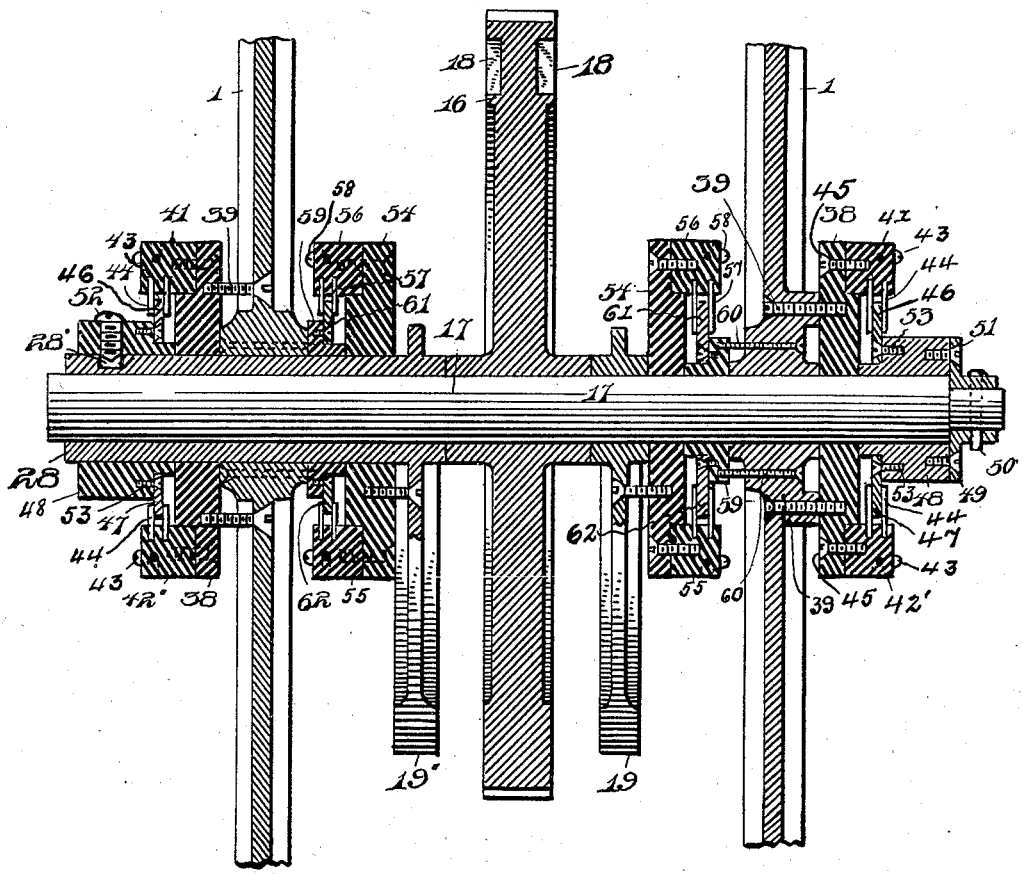
Figure 7:
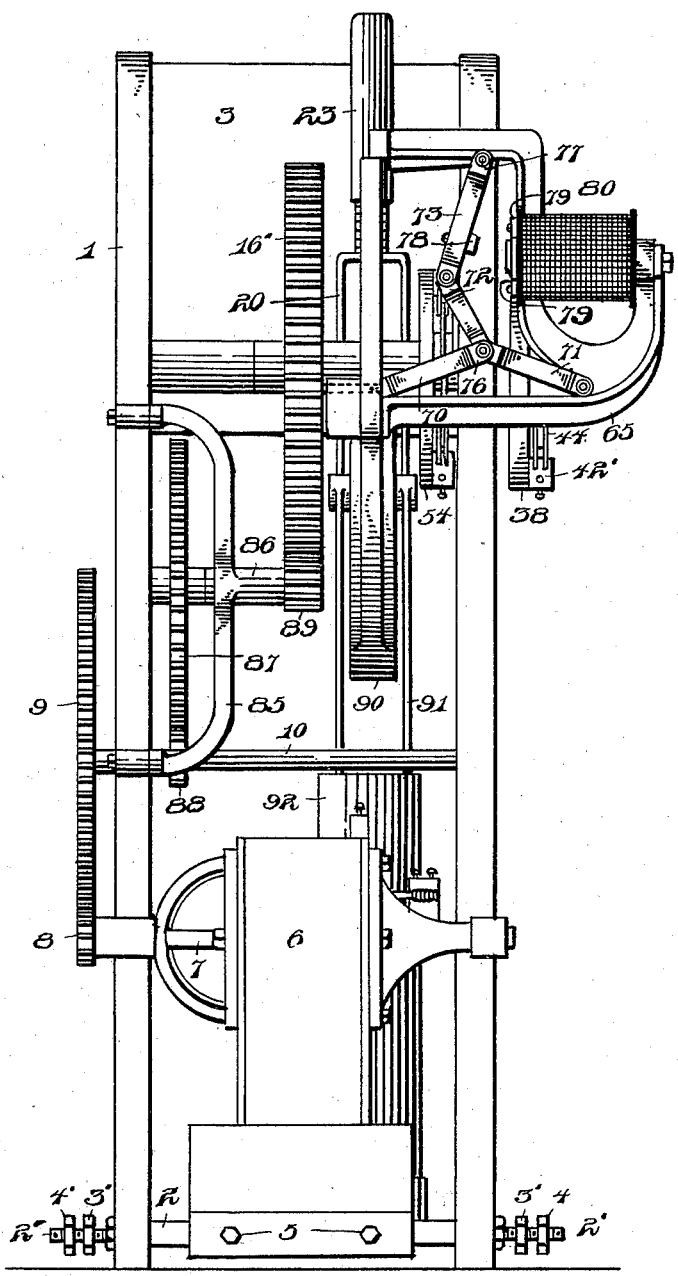
Figure 8:
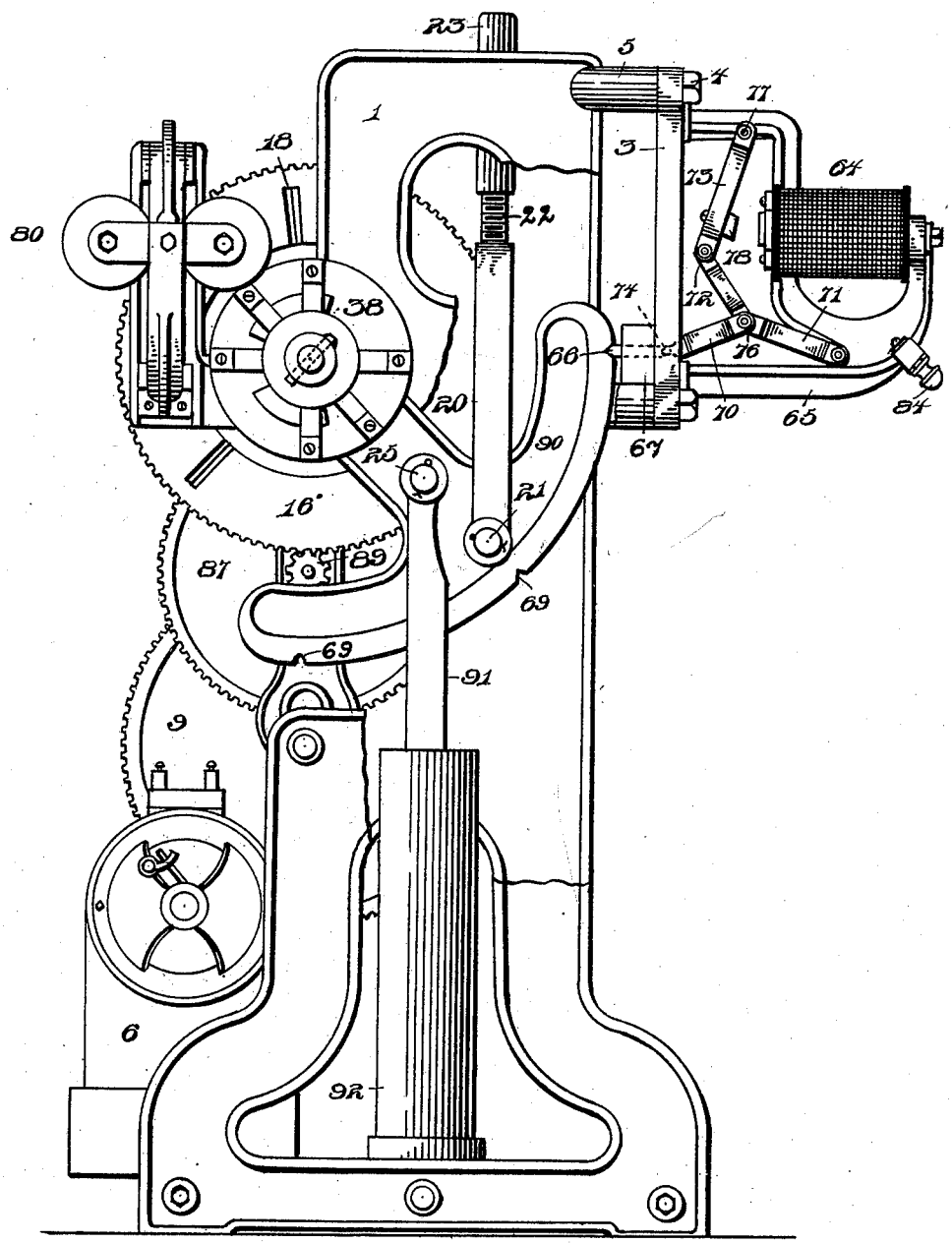

Figure 1 is a front elevation of the mechanism for operating two signals that are supported on the same post. Fig. 2 is a side elevation of the same with one of the standards or uprights partly broken away the better to show the parts. Fig. 3 is a side elevation of the complete signal-operating mechanism, the supporting-post being partly broken away, showing the signals or semaphore-arms supported by a single post and showing the different positions of these arms in full and dotted lines. Fig. 4 is a detail perspective view of one of the lock-magnets. Fig. 5 is a like view of one of the locking-blocks for holding the signal locked in the position to which it has been moved. Fig. 6 is a cross-sectional view of a part of the mechanism, showing the main driving clutch-wheel, circuit-controllers, sectors, circuit-connectors, and a part of the standards. Fig. 7 is a front elevation of a modified form of signal-operating mechanism for actuating a single signal or semaphore-arm. Fig. 8 is a side elevation of this modified form of construction for operating a single signal or semaphore-arm. Fig. 9 is a front elevation of a part of the mechanism, showing the circuit-controller and circuit-connector. Fig. 10 is a vertical sectional view of the same. Fig. 11 is a side elevation of the circuit-controller and the main driving clutch-wheel, showing a part of one of the standards or uprights. Fig. 12 is a cross-sectional view through the main drive-shaft and insulation of the circuit-connector, showing the main driving clutch-wheel in side elevation. Fig. 13 is a diagrammatical view showing the circuits for operating two or more signals or semaphore-arms supported on the same post, the circuit-controllers being shown in the position they occupy when the signals are at "red" or danger positions. Fig. 14 is a like view of the circuits for operating the single machine, three consecutive blocks or sections of track being shown with the circuit-controllers in the "white" or clear position, "green" or caution position, and red or danger position, respectively.

The improvements are shown and described in connection with the semaphore type of signal, but are not limited to this type or style, and in the main or preferred form of signal-operating mechanism I have shown two signals or semaphore-arms to be operated independently of one another and adapted one to be the signal for one line and the other to act as the signal for a branch or diverging line, the principle, however, not being limited to two signals, as shown in this illustration of the invention, as additional signals or semaphore-arms may be supported from the same post and operated by the same mechanism, as may be required by conditions in the line. In the modified form—that is, in the operating mechanism for the single signal or semaphore-arm—the construction is identical with that of the mechanism for operating the two signals or semaphore-arms, only that but one sector, one circuit-controller, one pair of lock-magnets, one circuit-connector, and one pair of main driving-wheel clutch-magnets are employed instead of two of each, as is required for the two signals or semaphore-arms. It will be evident, of course, that were more than two signals or semaphore-arms employed the parts of the signal-operating mechanism necessary for the operating of each additional signal or semaphore-arm would be increased in number, as required, according to the number of signals or semaphore-arms employed.

I will first describe the signal-operating mechanism, and in the drawings, 1 indicates the standards or uprights spaced apart and connected together by stay-bolts 2 and by a bridge-plate 3, the latter being connected to the standards by cap-screws 4, engaging into studs 5, carried by said standards. The mechanism is preferably actuated to shift the signal by means of a motor 6, the armature-shaft 7 of which carries a high-speed pinion 8 to mesh with the gear 9, carried on the end of a shaft 10, that is journaled in the standards or uprights 1. This shaft 10 carries a small pinion 11, which in turn meshes with a gear 12, that is mounted on a shaft 14, the latter being journaled in the standards or uprights. This shaft 14 also has mounted thereon a pinion 15, which meshes with the main driving clutch-wheel 16, carried by the drive-shaft 17. This clutch-wheel in the form of mechanism for operating two signals or semaphore-arms supported on the same post is provided on each side with recesses or grooves 18, substantially V-shaped in cross-section and which are arranged on the respective sides of the wheel exactly opposite to each other and spaced on each side an equal distance apart. These recesses or V-shaped grooves are adapted to receive the clutch that locks the main driving-wheel to the sector to which the signal or semaphore-arm is connected and cause said wheel and sector to move in unison and for a purpose and manner as will be hereinafter explained. The drive-shaft 17 is journaled in the standards or uprights 1, and mounted on the shaft at one side of the said wheel is a sector 19, to which a yoke 20 is connected by a pivot-pin 21. This yoke has a threaded end 22 to receive an adjusting-sleeve 23, which connects the said yoke with the rod 24, the latter connecting with the signal or semaphore-arm, as will be further explained. This sleeve 23 is formed in one end with right-hand threads and in the other end with left-hand threads (not shown) in order that the throw of the rod 24 may be lengthened or shortened, as will be readily apparent. The sector 19 also has connected thereto by a pivot-pin 25 a yoke 26, carrying a piston (not shown) which operates in a dash-pot 27, arranged between the standards or uprights.

Mounted on the drive-shaft 17 at the opposite side of the wheel 16 to that at which the sector 19 is mounted is a sleeve 28, in which the drive-shaft 17 is free to rotate, this sleeve being also free to rotate in the standards or upright in which it is journaled. This sleeve 28 carries a sector 19' of construction identical with the sector 19, which has pivoted thereto by a pin similar to the pin 21 a yoke 20', having a threaded end 22' for connection with the sleeve 23', that connects said yoke and sector with the rod 24' for operating the other signal or semaphore-arm. This sleeve 23' is of course threaded oppositely in opposite ends for the same purpose as the sleeve 23. The sector 19' is likewise connected by a pivot-pin to a yoke 26', carrying a piston (not shown) which operates in a dash-pot or cylinder 27', placed beside the dash-pot or cylinder 27. The rod 24 is connected to one signal or semaphore-arm and the rod 24' to the other signal or semaphore-arm, and in the present illustration of the invention I have shown the rod 24 connected to the lower signal or semaphore-arm 28 and the rod 24' to the upper signal or semaphore-arm 29. These signals or semaphore-arms are mounted in the ordinary type of spectacle-frame 30, carried by heads 31, rotatable upon the tubular post or support 32, so that the positions of the signals or semaphore-arms may be changed irrespective of each other, also irrespective of the position in which the inclosing box or casing 33 for the signal-operating mechanism may have been placed in and without rotation of the tubular post or support 32. This construction of rotatable head carrying the signal or semaphore-arm has been made the subject of a separate application for Letters Patent, and the construction is therefore not shown in detail in this application.

The rods 24 24' are connected to their respective semaphore-arms or signals by means of an arm or lever 34, which is connected to and actuates the shaft or pivot pin 35, that carries the signal or semaphore-arm.

The inclosing box or casing 33 for the signal-operating mechanism is preferably constructed, as shown in Fig. 3, with an upper and a lower compartment, the upper compartment 36 being adapted to receive the relays used in connection with signals of this character and the lower compartment to receive the signal-operating mechanism. Owing to improvements of construction in the signal-operating mechanism I am enabled to shorten the height of the same to such an extent as to provide the upper compartment for the relays without increasing the standard height of the inclosing box or casing, and the placing of the relays within the same box or casing that incloses the signal-operating mechanism obviates the necessity of providing a separate casing for these relays, as is the usual form in this class of signals. A separate door may be provided for each compartment, so that access to either compartment may be readily had without interfering with the mechanism contained in the other compartment.

The motor-circuits, the circuit for energizing the lock-magnets, and the circuits for energizing the clutch-magnets are controlled by the movements of the signal and its operating mechanism—in this case an electric motor constituting electrically-operated means for operating the signal and circuit-controllers—which will now be described. For the two-arm signal, as in the present illustration, two of these circuit-controllers are provided, identical in their construction, and the same reference-numerals will be employed for each. These circuit-controllers each comprise an insulated disk 38, which in the one instance receives the main shaft 17 and is secured by bolts or screws 39 to the one standard or upright, and in the case of the other controller the disk receives the sleeve 28, but is secured in the same manner to the opposite standard or upright. These insulated disks 38 have mounted on the outer face contact-blocks 40 40' 41 41' 42 42', each block having a binding-screw 43 and a pair of spring-clips 44. The contact-blocks may be held by screws 45, as shown, passing through the insulated disk or in any other suitable manner. Contact-blades 46 47, by means of which the circuit is controlled, are carried on an insulated sleeve 48, which for the one controller is mounted directly on the shaft 17, to which it is rigidly secured by a collar 49 and pin 50, the sleeve 48 being secured to the collar 49 by screws 51 or in any other suitable manner. In the opposite controller the sleeve 48 is mounted on the sleeve 28, to which it is secured by a pin 52. In each controller the contact-blades may be secured to the insulated sleeve 48 by screws 53, as shown, or in any other suitable manner. In order to hold these contact-blades in the position in which they have been placed by the movement of the operating mechanism, I provide the collar 49 on opposite sides with slots 50', through which the pin 50 extends, and for the controller which is mounted on the sleeve 28 I provide the latter with a slot 28', in which the screw or pin 52 may travel in the same manner as the pin 50 will travel in the slots 50' in the opposite collar 49.

In order to dispense with all hanging connecting-wires, I provide rotating connectors for this purpose, the one being mounted direct upon the shaft 17 and the other upon the sleeve 28, as is the case with the circuit-controllers. These connectors each comprise an insulated disk 54, the one connected by screws or equivalent means to the sector 19 and the other to the sector 19'. These disks have connected thereto contact-blocks 55 56, each of which carries a pair of contact springs or clips 57 and a binding-post 58. Mounted upon the shaft 17 for the one connector and upon the sleeve 28 for the other connector is an insulated collar 59 in both connectors, these collars being connected rigidly to the standards or uprights by bolts or screws 60. Each of these collars carries contact plates or segments 61 62, with air-gaps 63 between their ends (see Fig. 12) and contact or binding posts 61' 62' connected to the plates or segments. As shaft 17 is actuated clips 57 will be rotated to the right, thereby forming a continuous sliding contact on segments 61 and 62, since they move in unison with the sector.

The signal is locked in the position to which it has been moved by lock-magnets and improved toggle mechanism, which will now be described.

The lock-magnets 64 for each signal are supported on brackets 65, (one of which is shown in detail in Fig. 4,) these brackets being bolted to the bridge-plate 3. These electromagnets are adapted when energized to actuate a locking-block and force the same into locking engagement with the sector and lock the latter and the signal at the position to which it has been moved. This locking-block 66 operates within an opening provided therefor in the bridge-plate 3 and through a block 67, cast on said plate. The locking-blocks have their forward ends 68 made substantially V-shaped in cross-section, and these ends are adapted to be forced into engagement with the sectors in V-shaped grooves or recesses 69, three of these being provided in order that the signal may be locked in each of its three positions. Ordinarily the signal will only be locked at the caution and clear positions; but in some instances it may be desired to lock the signal in the danger position, and for this reason I provide the sector with three notches 69. To lock the signal at the danger position, I will simply connect a wire to the back contact of the track-relay in series with the lock-magnet, clutch-magnet, and motor. The locking-blocks are actuated by a series of toggle-links 70 71 72 73, the links 70 and 71 being pivoted together and the link 71 pivoted at its one end to the bracket or frame 65. The free end of the link 70 is machined, as at 74, to engage in the V-shaped groove 75 in the rear end of the locking-block 66. The pivot-pin 76, which connects the links 70 and 71 together, also connects the lower end of the link 72 to the lower links 70 71, the upper end of the link 72 being pivoted to the lower end of the link 73 and the upper end of the latter link being pivoted by a pin 77 to the upper arm of the bracket or frame. The armature 78 of the lock-magnet is secured on the link 73, and surrounding the ends of the cores of these magnets is a brass plate 79 to relieve the strain on the winding of these magnets and insulation. This plate is supported by the bracket or frame, and the pounding of the armature being direct against the plate the shock and strain thereof is relieved from the electromagnets and delivered direct upon the bracket or frame, as will be apparent, and this plate also serves to preserve the alinement of the cores and prevent their being driven into the winding.

The main wheel 16 is actuated to operate the mechanism and move the signal by clutch-magnets, one for each of the signals. These magnets 80, together with their supportingbracket, their toggle-levers, and other details of construction, are identical with the lock-magnets heretofore described and as shown in detail in Fig. 4 of the drawings. The bracket or frame which supports these electromagnets is attached to an extending arm 81, formed integral with the sectors 19 19', this arm of each sector having an opening and a block 82, in which the locking-block 83 operates. This block 83 is of the same form as used in connection with the lock-magnets shown in detail in Fig. 5, and its V-shaped edge engages into the V-shaped grooves or recesses 18 in the wheel when the magnets are energized, locking the wheel 16 to the sector or sectors and actuating the mechanism to operate the signal.

The lock-magnets and the clutch-magnets, while being of the same mechanical construction, are provided with different windings, that of the lock-magnets being of a higher resistance than that of the clutch-magnets, first, to economize the current, and, secondly, to offer sufficient resistance to prevent enough of current passing to operate the motor. The bracket or frame 65 of the lock-magnets carries a binding-post 84, to which one terminal of the winding of said magnets is connected and to the other end of which the line-wire is connected, as will be further explained in the description of the circuits.

In the construction of the operating mechanism for operating a single signal or semaphore-arm the same reference-numerals have been applied to those parts in which the construction is identical with the mechanism for operating two or more independent signals. In this form of machine but one circuit-controller, one pair of lock-magnets, one pair of clutch-magnets, one connector, and consequently but one sector, its connections and dash-pot, are employed. The drive-wheel 16' in the construction in this single machine need, therefore, be provided on but one side with the V-shaped notches, and is mounted on the drive-shaft 17, together with the circuit-controller, the sleeve 28 and the circuit-controller carried by the latter in the double machine being dispensed with. To one of these standards or uprights in this form is attached a bracket 85, in which and in the standards or upright carrying the same is journaled a shaft 86. This shaft 86 has mounted thereon between the bracket and the standard a gear 87, which meshes with a pinion 88, mounted on the shaft 10, this pinion being the equivalent of the pinion 11, only placed in different position on the shaft, and the shaft 86 and gear 87 are the equivalent of the shaft 14 and gear 12. The shaft 86 also carries a pinion 89 to mesh with the gear of the main driving-wheel 16', thereby gearing said drive-wheel to the motor. The sector 90 in this single form of machine has connected thereto in like manner to either of the sectors in the double machine a yoke 91, carrying a piston (not shown) which operates in a dash-pot 92.

Figs. 9, 10, 11, and 12 of the drawings show the detail construction of the circuit-controller, the connector, and the drive-wheel, and as this construction and the mounting of the same upon the drive-shaft is the same as for the one signal of the double machine this showing of these details is applicable alike to the single and double form of machine, with the exception that the drive-wheel will, as shown in these views, be grooved on but one side for the single machine.

In either the single or double form of machine I provide the base 33' of the inclosing box or casing 33 with slotted lugs 34', (see Fig. 3,) so positioned upon the base as to receive in their slots the projecting ends 2' of the stay-bolts 2. These projecting ends of these bolts are threaded, and on each projecting end is mounted a pair of nuts 3' 4'. The threaded ends of the stay-bolts engaging in the slots of the lugs 34', the operating mechanism as a whole is securely fastened by the tightening of the nuts 3' at each side of the mechanism against the inner face of the lugs 34' and tightening the nuts 4' against the outer face of said lugs. The motor 6, it will be observed, is mounted upon one of the stay-bolts 2, between the uprights or standards, and is adjustable thereon, being secured by lock-bolts 5'. This mounting of the motor upon one of the stay-bolts insures the alining of the motor with the mechanism, and this motor being adjustable or mounted on the stay-bolt so as to be swung thereon admits of the adjusting of the high-speed pinion 8 in its mesh with the gear 9 by simply slacking up bolts 5' and swinging motor upon the stay-bolt to regulate the mesh of pinion 8 and gear 9. This mounting of the motor in this manner also permits of the gears being thrown entirely out of mesh desired, so as to prevent any possible operation of the mechanism in case of making necessary repairs or the like.

In signals of the semaphore type as heretofore operated the motor-circuits and the circuits for energizing the lock-magnets are controlled in accordance with the movements of the mechanism and have circuit-breakers so arranged with reference to a movable part of the switch-operating mechanism or the signal as to be opened and closed in a predetermined order. In my invention, while the motor-circuits and the circuit for energizing the lock-magnets and the clutch-magnets are operated in accordance with the movements of the mechanism, I employ a normally closed circuit, which is adapted to be opened only at the track-relay by the track-circuit, and included in this normally closed circuit is a rotary circuit-controller operated by the driving-shaft of the operating mechanism and through which circuit-controller a circuit is at all times completed to the battery irrespective of the position of the circuit-controller, the circuit being completed through the motor, clutch-magnet, and lock or releasing magnet in series, the resistance of the lock or releasing magnet being so adjusted that there is insufficient current to energize the motor and the clutch-magnets to cause their operation, simply acting as line for the releasing or lock magnets.

In Fig. 13, which is a diagrammatical view of two signals supported from the same post or support, the circuit-controllers are shown in the position they occupy when the signals are at red or danger position, to which positions they have been shifted by the opening of the track-relay, due to a train entering on block A of the main track, and also the existence of a train on the block or section B of the side track. When the train passes into the following block, (not shown, Fig. 13,) thereby permitting the track-relay to close, the circuit-controller is shifted by the main driving-shaft to the green or caution position, the circuit being still closed through the motor, clutch-magnets, and lock or releasing magnets. When the train passes into the following block, (not shown,) the circuit-controller is shifted from the green or caution position to white or clear position of the signal or signals by the closing of the three-position relay, the circuit being still closed through the motor, clutch-magnets, and three-position relay. The movement of the circuit-controller is timed so that it will close with the next contact, which is connected to the same circuit before leaving the previous contact.

I will now describe the operation of the two signals supported from the same post or support, the one signal for the main track and the other signal for the side track, as shown in Fig. 13 of the drawings. As in the usual practice, the rails between the adjacent sections are constructed to form a circuit, the rails of each section or block being insulated from those of the adjoining block or section. In Fig. 13 but one section or block A of the main track is shown, and likewise but one section or block B of the side track. Each section A of the main and each section B of the side track has connected therewith a relay 93 and a track-battery 94. In practice in automatic signaling the track-circuits and signal-operating mechanism controlled thereby are generally so arranged that the signal at the entrance of each section or block will be shifted to red or danger position as soon as the front pair of wheels of the engine passes the insulating-point. Now, with reference to Fig. 13, the train moving toward the right as it passes from the preceding block (not shown) onto section or block A of the main track completes the circuit across the axle of the front pair of wheels of the train, thereby short-circuiting the current from the track-battery 94, and the track-relay 93 of the main track is shunted and its contact 93' opened, thereby opening the circuit from the motor-battery 95, releasing the lock-magnet, and allowing the sector to drop and raise the signal-arm either from clear or caution to danger position. In Fig. 13 the reference-letter C indicates the diagrammatical view of the upper signal 29 and the letter D a like view of the lower signal 28, both supported from the same post. The upper signal 29 governs the trains on the main track, and the lower signal 28 governs the trains on the side track. It will of course be understood that if the side track is of but one section or block in length but one double or two-arm signal will be employed— namely, at the entrance to the side track—and on the succeeding blocks or sections of the main track the single-arm signals may be employed. If, however, the side track is of more than one section or block in length, as many of the two-arm signals will be employed as there may be sections or blocks in the side track. When the train enters section or block A or B, as the case may be, thereby shunting the track-relay 93, opening its contact 93', opening the circuit from the motor-battery 95, releasing the lock-magnet, and allowing the signal to go to danger or red position, it has moved the contact-blade 46 into engagement with the clips carried by the contacts 40' 41 and blade 47 into contact with the clips carried by the contact 42'. The signal is automatically held in this danger or red position until the last pair of wheels of the train passes out of the block A or B, as the case may be, at which time the track-relay 93 is energized by the track-battery 94, closing the contact 93' and completing the circuit leading to the signal. The closing of the contact 93' completes the circuit from the motor-battery 95 through wire 96, relay-contact 93', and wire 97 to contact 40', contact-plate 46, contact 41, wires 98 99, clutch-magnet 80, wire 100 to motor 6, and back to battery 95 through wire 101. On the completion of this circuit the mechanism operates to partially rotate the circuit-controller, so that the contact-plate 46 is moved into contact with the spring-clips carried by contact 40 and the contact-plate 47 is moved into contact with the spring-clips carried by the contact 42. Upon the engagement of the plate 46 with the clips carried by contact 40 the lock-magnet 64 is shunted into the motor-circuit and the circuit is completed through wires 107 108, lock-magnet 64, wires 109 99, clutch-magnet 80, wire 100, motor 6 to battery 95 through wire 101. Immediately upon the lock magnet or magnets being shunted into the motor-circuit the plate 46 passes out of engagement with the clips of contact 41 and plate 47 passes into engagement with clip 42, thereby forming a circuit over wires 105 103 97, contact 93', and wire 96, through battery 95, wire 101, motor 6, wire 100, clutch-magnets 80, wire 106, over clips of contact 42', back to the clips of contact 42, the beginning of the circuit, leaving the lock-magnet in series with the clutch-magnet and motor. The signal at this time has been moved into the green or caution position; but the train passing out of this block or section into the succeeding one (not shown) closes the three-position relay 102, thereby closing the motor-circuit and allowing the signal to go to white or clear position. As the signal is moving from caution or green position to clear or white position the circuit-controller is actuated so as to move blade 46 out of the clips of contact 40′, but remaining in engagement with the clips of contact 40. During this movement of blade 46 blade 47 is moved from the clips of contact 42′ into engagement with the clips of contact 41′, thereby shunting in the motor-circuit through wire 108, lock-magnet 64, wires 109 99, clutch-magnet 80, wire 100, motor 6, wire 101, battery 95, wire 96, contact 93′, contact 103, wires 105 108, and clip 42, locking the signal in the white or clear position. In this showing of the two-arm system, Fig. 13, the connections from the respective tracks to the operating mechanism are made by wires 110, and the connections from the three-position relays 102 by the line-wires 111 to the line-wires 112 of the succeeding block or section. In this circuit system for the double or two-arm machine shown it will be observed that both signals are operated from the same motor. When the blade in the controller engages the clips carried by the contact connected to the lock-magnet, the lock-magnet is shunted into series with the motor, and the conductors in the clutch-magnet and motor are used as the return for the lock-magnet circuit back to the battery instead of employing an independent return from the clutch and lock magnets, so that the motor-circuit is closed at all times during any part of the movement from "danger" to "caution" or from "caution" to "clear," the track and three-position relays being employed only to allow signal to go to danger or caution positions.

In Fig. 14 I have shown a diagrammatical view illustrating three blocks or sections of track with a signal for each block or section, the signal for block or section E of the track being shown in the clear or white position, that for block or section F being shown in the green or caution position, and the signal for block or section G being shown in the danger or red position. For the purpose of clearly illustrating the operation we will assume a train has entered block or section G, moving in the direction indicated by the arrow H. The signal for block or section F will when the train occupies block or section G be at the caution or green position, as shown in this view, while the signal of block or section E will be at the clear or white position, as shown in this view, provided of course that no train has followed into either block E or F. Referring now to the signal shown in danger or red position in this view, it will be observed that when the train enters the section or block G, thereby shunting the track-relay 93, opening its contact 93′ and opening the circuit from the motor-battery 95, releasing the lock-magnet, and allowing the signal to go to danger or red position, it has moved contact-blade 46 into engagement with the clips carried by contacts 40′ 41 and blade 47 into contact with the clips carried by contact 42′. The closing of contact 93′ in block or section G due to the train passing into this block or section, as described, completes the circuit from the motor-battery 95 through wire 96, relay-contact 93′, and wire 97 to contact 40′, contact-plate 46, contact 41, wires 98 99, clutch-magnet 80, wire 100 to motor 6, and back to battery 95 through wire 101. This signal (of block G) is automatically held in this danger position as long as the train remains in this block or section. When the last pair of wheels of the train pass out of block F into block G, the track-relay 93 (of block F) is energized, closing the contact 93′ of block F and completing the circuit leading to the signal of said block. On the completion of this circuit in block or section F the signal mechanism of block or section F operates to place the signal in the green or caution position, thereby bringing the circuit-controller into the position so that the contact-plate 46 is moved into contact with the spring-clips carried by contact 40′ and the contact-plate 47 is moved into contact with the spring-clips carried by contact 42. Upon the engagement of the plate 46 with the clip carried by contact 40 the lock-magnet 64 (of signal in block or section F) is shunted into the motor-circuit and a circuit is completed through wire 107, wire 108, lock-magnet 64, wire 109, clutch-magnet 80, wire 100, motor 6 to battery 95 over wire 101. Immediately upon the lock magnet or magnets 64 of the signal in this block F being shunted into the motor-circuit the plate 46 passed out of engagement with the clips of contact 41 and plate 47 passed into engagement with clips carried by contact 42, thereby forming a circuit in the signal of block F for the three-position relay 102, located in block or section E, leaving the lock-magnet 64 of block or section F in series with the clutch-magnet and motor. The signal at this time in block or section G, which section or block is occupied by the train, is at red or danger position and the signal in block or section F is in green or caution position. The passing of the train, however, from block or section F to block or section G closed the three-position relay 102 of block or section E, thereby closing the motor-circuit of this signal for block or section E and allowing this signal to go to white or clear position, this three-position relay being closed by wire 96, contact 93′, wires 97 104, plate 46, contact-clips 40′ 40, wires 107 108, line 111 through three-position relay 102, (of signal in block E,) wires 112 99, clutch-magnet 80, wire 100, motor 6 to battery 95 over wire 101. The signal of block or section E while train is in block or section F would be at the caution or green position, and the passing of the train into block or section G allowed signal in block E to go to clear or white position. As this signal in block or section E moves from caution or green position to clear or white position (the position shown for signal in block E) the circuit-controller is actuated so as to move blade 46 out of the clips of contact 40', but remaining in engagement with clips of contact 40. During this movement of blade 46 blade 47 is moved from the clips of contact 42 into engagement with the clips of contact 41', thereby shunting in the motor-circuit (of signal in block E) through wires 108, lock-magnet 64, wire 109, clutch-magnet 80, wire 100, motor 6, wire 101, battery 95, wire 96, contact 93', wire 97, contact 103, wire 105, and clip 42, over plate 47 to clip 41', the beginning of circuit locking the signal in the white or clear position and deënergizing the clutch-magnet and motor. In this showing of the single-arm system, Fig. 14, the track-relays 93 are connected to the track by the wires 110, and the three-position relay 102 of each signal is connected to the line-wires 112 of the succeeding block or section by wires 111.

I desire to call attention to the fact that with the circuits as herein shown and described, either for the two-arm signal, Fig. 13, or for the single-arm system, Fig. 14, the signals are operative with the movement of a train in either direction. Assuming a train which is in block or section G for some reason backs into block or section F, it will cause signal in block or section F to immediately go to danger or red position, thereby opening up three-position relay 102 of signal for section or block E and causing the signal of this section or block E to go to caution or green without first moving to a danger or red position, as is the case when train is moving in running direction. The lock-magnets are given a winding of high resistance, and when thus connected in series to the motor this high resistance acts to reduce the current passing through the clutch-magnets and motor to the battery to such an extent as to practically deenergize the clutch-magnets and motor, thereby stopping the operation of the mechanism and locking the signal at the caution position. In this circuit system for the double or two arm machine shown it will be observed that both signals are operated from the same motor, and in the diagrammatical view, Fig. 14, for the single signal three signals are shown, one for each section or block E F G, with a separate motor for operating each signal. The connections, however, and the operation of the mechanism to actuate the signal-arm are identical, and the same reference-numerals for the connections and parts have been employed, since the operation is the same.

When the blade in the controller engages the contact connected to the lock-magnet, the lock-magnet is shunted in series with the motor and the conductors in the clutch-magnet and motor are used as the return for the lock-magnet circuit back to the battery instead of employing an independent return from the clutch and lock-magnet, so that the circuit is closed at all times.

It will be observed that the circuit-controller is electrically operated for controlling the lock-circuit during the movement of the signal from danger to caution and from caution to clear position, while on the movement of the signal from clear to danger position this circuit-controller is mechanically controlled, the operating mechanism serving to automatically return the signal to the danger position upon the release of the lock from engagement with the sector when the signal is at either the clear or caution position. I desire also to call attention to the fact that by the employment of the clutch driving-wheel with the clutch magnet or magnets to engage the side or sides of the same the magnet or magnets operate to engage with the driving-wheel immediately upon the energizing of the motor irrespective of the position in which this wheel may have stopped with the previous operation of the signal, there being no "drifting" of the wheel previous to the locking up thereof with the clutch-magnets to operate the signal.

Having thus fully described my invention, what I claim as new, and desire to secure by Letters Patent, is—

1. In a signal mechanism, the combination of a signal having a bias to danger position, electrically-operated mechanism for electrically locking the signal at caution and clear positions, and a circuit-controller operated by the driving means for controlling the lock-circuit during the movement of the signal from danger to clear position, means normally acting to operate the circuit-controller during the movement of the signal from clear to danger position.

2. In a signal mechanism, the combination of a signal having a bias to danger position, means for locking the signal at caution and clear positions, and a circuit-controller electrically operated for controlling the lock-circuit during the movement of the signal from danger to clear position and mechanically operated during the movement of the signal from clear to caution or danger positions, the lock-circuit being normally closed.

3. In a signal mechanism, the combination of a signal having a bias to danger position, electrically-operated mechanism including a clutch-magnet and a lock-magnet for holding the signal at caution and clear positions, a motor for operating said mechanism, and a circuit-controller electrically operated by train movements and adapted to continuously maintain a closed circuit through the clutch-magnet and motor during the movement of the signal to a caution and clear position, and through the lock-magnet at a caution and clear position.

4. In a signal mechanism, the combination of a signal automatically movable to danger and caution positions, electrically-operated mechanism including a clutch-magnet and a lock-magnet for shifting the same and holding the same at caution and clear positions, a motor for operating said mechanism, and means in the motor-circuit and adapted to be operated by train movements for continuously maintaining a closed motor-circuit through the clutch-magnet during the movement of the signal to caution and clear position, and through the lock-magnet at caution and clear positions.

5. In a signal mechanism, the combination of a signal automatically movable to danger and caution positions, mechanism for shifting the signal to caution and clear positions, a motor for actuating said mechanism, an automatic rotary circuit-controller in the motor-circuit for continuously maintaining a closed motor-circuit during the shifting of the signal from danger to caution and from caution to clear positions, and means in the motor-circuit for holding the signal at caution position.

6. In a signal mechanism, the combination of a signal automatically movable to danger position, mechanism including a sector for shifting the signal to caution and clear positions, a motor for operating said mechanism, means in the motor-circuit for continuously maintaining a closed motor-circuit during the movement of the signal from danger to caution and from caution to clear, and electrically-controlled means for locking the signal at caution and clear positions.

7. In a signal mechanism, the combination of a signal automatically movable to danger position, mechanism including a sector for shifting the signal to caution and clear positions, said mechanism being controlled by train movements, a motor for actuating the mechanism through a motor-circuit that is closed during the shifting of the signal from danger to caution and from caution to clear positions, and means in the motor-circuit for continuously maintaining the same closed during said movement of the signal.

8. In a signal mechanism, the combination with two or more signals supported on the same post each having a bias to danger position and each automatically movable to danger or caution position independent of the other, of a signal-operating mechanism for shifting the signals to caution or clear positions, a single motor for operating the signals, said signals being operative independently or in unison, and electrically-controlled means for holding each signal at caution and clear positions.

9. In a signal mechanism, the combination of two or more signals each having a bias to danger position and suspended from the same post or support, mechanism for shifting the signals from caution and clear positions independently of or in unison with each other, a single motor for operating the signals, and electrically-controlled means for holding each signal at caution and clear positions.

10. In a signal mechanism, the combination of two or more signals each having a bias to danger position and suspended from the same post or support, mechanism for shifting each signal to caution and clear positions, a single motor for operating the signals, and means operated by train movements for electrically controlling each signal independent of the other.

11. In a signal mechanism, the combination of two signals each having a bias to danger position and suspended from the same post or support, the one signal governing one line, and the other signal governing the second line, mechanism for shifting the signals to caution and clear positions simultaneously or independently of each other, a common motor for actuating the mechanism to shift either or both signals, and electrically-controlled means for holding the signal or signals at caution and clear positions.

12. The combination of a drive-shaft, a sector mounted on said drive-shaft, a signal-arm connected to said sector, a driving clutch-wheel mounted on the shaft, an electrically operated lock adapted to connect the sector to the clutch driving-wheel, a motor geared to the driving clutch-wheel, and a rotary circuit-controller on the drive-shaft, substantially as described.

13. The combination of a drive-shaft, a sector mounted on said shaft, a signal or semaphore arm connected to said sector, a driving clutch-wheel mounted on the shaft, means for locking said driving clutch-wheel to the sector, an electrically-controlled motor, a rotary circuit-connector included in the controlling-circuit of the motor, and a rotary circuit-controller on the drive-shaft, substantially as described.

14. The combination of a drive-shaft, a sector mounted on said shaft, a signal-arm connected to said sector, an electrically-operated lock adapted to hold the sector at certain positions, an operating-motor, with means on the drive-shaft and geared to said motor for operating the signal, said means being capable of immediate driving engagement upon the energizing of the motor irrespective of the position of the sector.

15. In a signal mechanism, the combination of a signal having a bias to danger position, means for shifting said signal, connections including a sector between the signal and the shifting means, a motor for operating the shifting means, a circuit-controller in the motor-circuit for controlling the circuit, said circuit-controller continuously maintaining a closed circuit during the movement of the signal from danger to caution and from caution to clear positions, means for holding the signal at caution position, and a rotary circuit-connector included in the motor-circuit.

16. The combination with a signal having a bias to and automatically held in the danger position, of signal-operating mechanism controlled by the movements of the train, a motor for operating said mechanism, means in the motor-circuit for continuously maintaining the same closed during the shifting of the signal from danger to caution and from caution to clear positions, and means for holding the signal at caution position.

17. In signal-operating mechanism, the combination with the signal having a bias to danger position and automatically held in the danger position, of operating mechanism for said signal, a motor for operating said mechanism to move the signal from danger to caution and from caution to clear positions, with means in the motor-circuit for continuously keeping the same closed during the shifting of the signal from danger to caution and from caution to clear positions, and means for holding the signal at caution and clear positions.

18. In combination with a signal having a bias to danger position, mechanism controlled by train movements to shift the signal from danger to caution and from caution to clear positions, a motor for operating said mechanism, a circuit-controller in the motor-circuit for continuously maintaining a closed circuit during the shifting of the signal from danger to caution and from caution to clear positions, means for holding the signal at caution position, and a rotary circuit-connector included in the motor-circuit.

19. The combination of a drive-shaft, a sector mounted on said drive-shaft, a signal-arm connected to said sector, a driving clutch-wheel mounted on said shaft with recesses or grooves in the side thereof, an electrically-operated lock adapted to connect the sector to the driving clutch-wheel by engagement with said recesses or grooves, and a dash-pot connected to said sector, substantially as described.

20. The combination of a drive-shaft, a sector mounted on said drive-shaft, a signal-arm connected to said sector, a driving clutch-wheel mounted on the drive-shaft, an electrically-operated lock adapted to connect the sector to the driving clutch-wheel, a motor geared to the drive-wheel, and means for adjusting said motor whereby the mesh of the gearing may be varied, substantially as described.

21. In a signal mechanism, the combination with a signal and signal-operating mechanism, of a box or casing for inclosing the signal-operating mechanism, said box or casing having separate compartments with independent openings to each compartment, a base for said box or casing, slotted lugs carried by said base, stay-bolts adjustably mounted in said slotted lugs, and an operating-motor adjustably mounted on one of said stay-bolts, substantially as described.

22. In a signaling mechanism, the combination with a signal and signal-operating mechanism, of a box or casing for inclosing the signal-operating mechanism, a base for said box or casing, slotted lugs carried by said base, stay-bolts adjustably mounted in said slotted lugs, and an operating-motor adjustably mounted on one of said stay-bolts whereby it may be alined with the operating mechanism, substantially as described.

23. In a signaling mechanism, the combination with a signal and signal-operating mechanism, of a box or casing for inclosing the signal-operating mechanism and provided with a separate compartment for inclosing the track-relays, a base for said box or casing, stay-bolts adjustably mounted on said base, a motor for operating the mechanism adjustably mounted on one of said bolts, and a dash-pot adjustably mounted on another of said bolts whereby said motor and dash-pot may be adjusted and alined with the signal-operating mechanism, substantially as described.

In testimony whereof I affix my signature in the presence of two witnesses.

REINHOLD HERMAN.

Witnesses:
JOHN NOLAND,
A. M. WILSON.